(12) United States Patent
Viveiros et al.

(10) Patent No.: US 8,583,481 B2
(45) Date of Patent: Nov. 12, 2013

(54) PORTABLE INTERACTIVE MODULAR SELLING ROOM

(76) Inventors: Walter Viveiros, Wachee, FL (US);
Howard Sharfe, Columbus, OH (US);
Daniar Hussain, Pittsburgh, PA (US);
Gregg Kulback, Johnstown, PA (US)

( * ) Notice: Subject to any disclaimer, the term of this patent is extended or adjusted under 35 U.S.C. 154(b) by 451 days.

(21) Appl. No.: 12/873,779

(22) Filed: Sep. 1, 2010

(65) Prior Publication Data
US 2011/0202396 A1 Aug. 18, 2011

Related U.S. Application Data

(60) Provisional application No. 61/304,035, filed on Feb. 12, 2010.

(51) Int. Cl.
*G06Q 30/00* (2012.01)

(52) U.S. Cl.
USPC .......... 705/14.4; 700/275; 700/276; 700/277; 700/278

(58) Field of Classification Search
USPC ......... 705/14.4; 700/275, 276, 277, 278, 286, 700/291, 295, 296; 702/188
See application file for complete search history.

(56) References Cited

U.S. PATENT DOCUMENTS

| | | | | |
|---|---|---|---|---|
| 4,471,586 A | * | 9/1984 | Shuch et al. | 52/36.2 |
| 5,724,774 A | * | 3/1998 | Rooney | 52/79.5 |
| 5,784,843 A | | 7/1998 | Greer et al. | |
| 5,809,708 A | | 9/1998 | Greer et al. | |
| 6,067,762 A | | 5/2000 | Greer et al. | |
| 6,128,873 A | | 10/2000 | Shipman et al. | |
| 6,862,853 B1 | | 3/2005 | Visser | |
| 7,373,377 B2 | | 5/2008 | Altieri | |
| 7,840,310 B2 | * | 11/2010 | Orfield | 700/275 |
| 2004/0260567 A1 | | 12/2004 | England | |
| 2005/0173362 A1 | * | 8/2005 | Squitieri et al. | 211/187 |
| 2005/0279032 A1 | * | 12/2005 | Buchanan et al. | 52/36.2 |
| 2007/0136081 A1 | | 6/2007 | Segal | |
| 2007/0235264 A1 | * | 10/2007 | Squitieri et al. | 186/57 |
| 2007/0294958 A1 | | 12/2007 | Kestermann | |

OTHER PUBLICATIONS

Heathkit Brochure, Apr. 1987.*
Home Automation Systems Brochure, vol. 39, Mar. 1999.*
Home Works Brochure, Lutron Residential Systems Division, Date Unknown.*

* cited by examiner

*Primary Examiner* — Michael Bekerman
(74) *Attorney, Agent, or Firm* — American Patent Agency PC; Daniar Hussain; Brian Smith

(57) ABSTRACT

Disclosed is a portable interactive modular selling room that recreates the home environment in a retail business location to help educate the user for sales and training purposes. The plug and play selling system utilizes standard electrical connectors to allow for seamless integration within a store without the need of electricians or construction contractors. Encompassing all five senses in an interactive environment develops an intellectual and emotional connection with the user which allows the product implementation to demonstrate features and value in a more meaningful and engaging manner over traditional retail environments. The computer system implemented inside of the system encompasses an interaction engine which utilizes sensors and monitoring equipment to record and analyze the user to provide real-time responses and also feedback to a central database for future interaction development. Increased customer satisfaction improves sales which allows for the sales system to remain economically viable.

11 Claims, 16 Drawing Sheets

400

1400

1500

1600

PORTABLE INTERACTIVE MODULAR SELLING ROOM

REFERENCE TO RELATED APPLICATIONS

This application claims priority from provisional application U.S. Ser. No. 61/304,035 entitled "A PORTABLE INTERACTIVE MODULAR SELLING DEVICE ENCOMPASSING ALL FIVE SENSES," filed on Feb. 12, 2010, the entirety of which is hereby incorporated by reference herein.

FIELD OF THE INVENTION

This invention relates to an article for interacting with customers to demonstrate the features of the products through automated selling device by encompassing all five senses to provide a private experience which emulates an experience found in a home environment. One application of the present invention is for use in a store location, where it replaces the traditional sales staff to help the consumer make educated purchasing decisions.

BACKGROUND OF THE INVENTION

Mattress shopping ranks high on the list of people's least favorite activities for many reasons. A sea of "look alike" products is very confusing. Row upon row of naked beds lined up like coffins is not an ideal atmosphere in which to engage the consumer. The retail environment shown in FIG. 16 is typical. Retailers in general, and bedding retailers in particular, have great difficulty establishing an intellectual and emotional connection with the consumer. Survey after survey indicates that what happens at the point of interaction between the consumer and the retailer affects both parties. For the consumer, a positive experience, making a connection, increases their willingness to purchase and enhances their overall level of satisfaction. For the retailer, delivering a more meaningful and engaging customer experience is critical to developing ongoing repeat business and its long term viability. The manner in which the consumer and the retailer interact is in need of significant improvement. The inventors have created an instrument and process that fundamentally changes the consumer-retailer dynamic.

The modular portable design of the disclosed invention enables ordinary people such as retail sales staff to assemble the sales room by snapping the modular pieces together instead of requiring the expense of construction contractors to build the room from scratch. Many retail stores limit themselves to simply displaying the product line on top of racks due to the additional construction expensive instead of allowing the user to experience the entire environmental experience of a combination line of products. The design of the innovative factory pre-fabricated selling room remains economically viable yet adds an array of addition features not found in conventional trade show rooms.

It is against this background that various embodiments of the present invention were developed.

BRIEF SUMMARY OF THE INVENTION

Accordingly, one embodiment of the present invention is a modular selling room for generating an environment that encompasses all five senses in a retail environment, made up of the following components: A set of pre-built sectional hollow panels locked together with hidden cam locks and installation compartments comprising a floor, walls, ceiling, and doors. A display screen connected to a computer system having an adaptive environmental digital product library logic module. A central client receiving and transaction area for use for answering any questions regarding sales of the products utilized within the modular selling room. A pre-manufactured electrical wiring system installed inside of said panels with interconnected twist locks to allow electrical and mechanical connectivity. A modular HVAC system that physically attaches to the panels and utilizes air duct supply and return pathways which are pre-manufactured within said panels. A designer veneer covering both sides of the panels to decorate and also hide any installation panel opening.

Another embodiment of the present invention involves a preinstalled dynamic adaptive lighting within the paneling connected into the adaptive environmental digital logic module. Based on the logic tolerances the lighting can adaptively turn on and off depending on the conditions sensed by the environmental digital logic module.

Another embodiment of the present invention involves a dynamic audio system that connects into the adaptive environmental digital logic module which includes a receiver, speakers and also includes connectivity to digital and analog music players that provides sounds in a manner that reflects the mood and tone desired within the room. If a particular music or sound is recognized during the feedback loop, then the software associated within the Interactive Client Based GUI Computer System and Environmental Digital Logic Module can adjust to better suit the customer within the room. The user is given an option to make suggestions during the experience to inform the computer system of whether they like or dislike the current music provided.

Another embodiment of the present invention involves a surveillance system utilizing motion sensor activated cameras. If a customer enters a room, a motion sensor triggers an alert to the environmental logic module. The software can communication with the various systems within the room to create a highly interact environment that adjusts all aspects of the room's controllable systems that accompany all five senses of the customer.

Another embodiment of the present invention involves an actuator system for controlling objects such as the sliding door, display, bed or any other objects within the selling room.

Another embodiment of the present invention involves a dynamic scent and air purification system. The equipment used to adjust the scent of the room can be installed in the plenum area or in the computer room.

Another embodiment of the present invention involves a universal remote to accommodate user interaction. The customer can interact with the system using a universal remote to make decisions on what products they are interested in. The remote can also control various aspects of the room such as the sound, smell, and lighting within the room to make it preferable to their personal tastes and desires. This information is recorded by the interactive client based GUI computer system and is analyzed to help understand the data associated with customers who ultimately purchase or do not purchase the products within the room.

Another embodiment of the present invention involves a plug based receptacle electrical hookup. In an effort to help reduce the time and cost associated with constructing a selling room, many of the connections associated with the various systems within the room include a plug-and-play hookup. For example, much of the wiring associated with the lighting within the panels can be pre-manufactured within the panels to reduce build time.

Another embodiment of the present invention involves a label organizational system with alphanumeric identifiers for key components. The alphanumeric identifier not only assists in the construction of the room, but also serves an identifier for the completed room for use as a commercial piece of equipment that can also be leased by the stores.

Another embodiment of the present invention involves a self-contained heating, ventilating and air conditioning system. If the pre-conditioned air within the store is less than desirable, space heaters, portable air conditioners, or wall mounted air conditioners can help maintain a desirable air quality within the selling room.

Yet another embodiment of the present invention involves a method for presenting products utilizing a portable interactive modular selling room, which involves receiving information from a user from monitoring sensors, displaying an interactive user interface having an adaptive environmental logic module, wherein the interactive user interface provides sensory information to all five senses, and provides feedback information in response to user actions, receiving input from a user from a universal remote, presenting information to educate said user with various features of the products implemented in the room, sending feedback information to a central server database; and correlating feedback information using a series of pre-defined weights and tolerances to collect, interpret and analyze the shopping habits associated with customers.

Yet another embodiment of the present invention involves a method for presenting products utilizing a portable interactive modular selling room, which involves presenting dynamic lighting, presenting audio effects, detecting the location of the user and continuously recording an array of three dimensional coordinates, moving physical objects within said room, changing the scent and air quality within said room, and accepting signals from a universal remote.

Yet another embodiment of the present invention involves a method for installing a portable interactive modular selling room including plugging receptacle electrical hookup, utilizing a label organizational system with alphanumeric identifiers for key components, and installing self-contained heating, ventilating and air conditioning system.

Yet another embodiment of the present invention is a portable interactive modular selling room for selling one or more products, made up of a set of one or more inter-locking panels arranged to create one or more areas within the portable modular selling room, including a sales area for receiving potential customers as well as closing sales with the customers, and one or more interactive product display areas that provide sensory information about the products to all five senses, and that provide feedback responsive to user actions.

Yet another embodiment of the present invention is a portable interactive modular selling that also includes a closed computer area for housing an interactive client-based graphic user interface computer system having an adaptive environmental digital product library logic module, where the interactive computer system provides sensory information about the products to all five senses, and provides feedback information in response to user actions Yet another embodiment of the present invention is a portable interactive modular selling that also includes a changing area for customers to allow customers to change into more comfortable clothing while experiencing the products in the interactive product display areas.

Other embodiments of the present invention will become apparent in the detailed description of the invention.

BRIEF DESCRIPTION OF THE DRAWINGS

The invention can best be understood in reference to the attached drawings, in which.

DETAILED DESCRIPTION OF THE INVENTION

Figure 1:
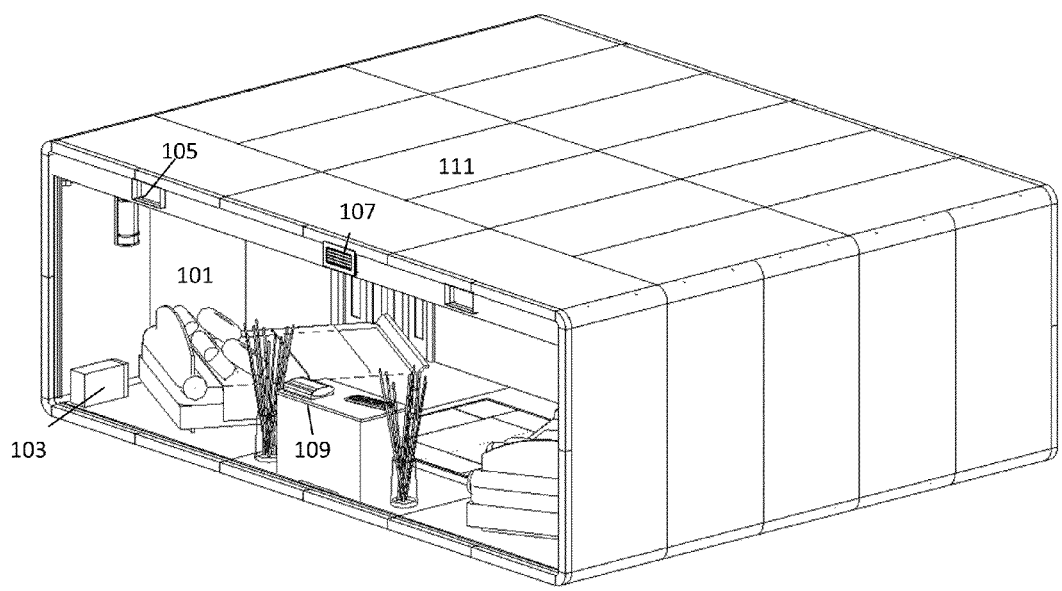
FIG. 1 illustrates an outside perspective of an example of a modular selling room showing the bedroom, intakes, and exhaust of the plenum area.

This invention relates to an article for interacting with customers to demonstrate the features of the products through automated selling device by encompassing all five senses to provide a private experience which emulates an experience found in a home environment. The modular portable design of the disclosed invention enables ordinary people such as retail sales staff to assemble the sales room by snapping the modular pieces together instead of requiring the expense of construction contractors to build the room from scratch. Many retail stores limit themselves to simply displaying the product line on top of racks due to the additional construction expensive instead of allowing the user to experience the entire environmental experience of a combination line of products. The design of the innovative factory pre-fabricated selling room remains economically viable yet adds an array of additional features not found in conventional trade show rooms.

According to one embodiment of the present invention, portable wall, ceiling, and floor components are constructed using four foot by eight foot panels that allow them to easily stack into crates for shipment to retail locations. Use of cam locks allows the panels to connect together without the use of elaborate construction equipment. Use of unique cam lock keys that ship with the unit helps prevent unauthorized access to the panels and equipment. The panels contain sub-panels that unlock and swing open to enable power extension cords, audio, video, and any type of cable required by the systems within the room to connect to their designated locations while remaining hidden from an end user after an installation is complete. A plenum space is designed for the movement of air which comprises a sealed chamber above the ceiling to handle the air movement. This plenum space also eliminates any exposed cable and wire required by electronic equipment. Plenum grade cable can easily be run across the ceiling and then dropped down through the wall panels to their desired destination. The designer veneer on top of the panels hides the sub-panel assembly while also improving the décor of the room itself. This enables retail store representatives with little or no construction abilities to easily and quickly assemble the modular selling room. The factory pre-manufactured panels include self-contained electrical wiring for lighting modules, control modules, and audio systems. By manufacturing the lighting inside of the ceiling and wall panels, through translucent portions, the installation time is reduced dramatically. The speakers from the audio system are also pre-installed in the ceiling panels. The plug-and-play nature of all the various electrical systems eliminates the need for an electrician.

An interactive client-based graphic user interface (GUI) computer system utilizes an environmental digital logic module to interact with the user's five senses to create a highly intelligent control system for selling products within a portable selling room. The environmental digital logic module includes a combination of computer hardware and software to process information to and from the systems within the room. The intelligence of the environmental digital logic module relies on a software-based system that analyzes data received by the sensors within the room and weights the data based on predefined settings. These settings and tolerances can be adjusted by an administrator remotely from a web based client or onsite via a graphic user interface. The control and feedback of the room allows an administrator to make adjustments to improve the end-user experience which help maximize the amount of sales produced. If a system within the room experiences technical difficulties, the digital logic module provides alerts to notify a list of contacts via email and telephone of any technical problems of specific components and conditions within the room.

A surveillance system comprising motion sensors and cameras allows the environmental digital logic module to determine the location of the user, and adaptively control other systems within said portable interactive modular selling room based on pre-programmed assignments. The surveillance system also provides security to eliminate tamping and theft within the modular room.

A dynamic audio system comprising a set of speakers' pre-manufactured in the ceiling panels, hidden microphones, and a receiver which connect to a digital logic module. The environmental digital logic module connects to the receiver to signal which sounds are produced based on a set of predefined logic assigned in the software. The microphone provides the digital logic module information to make audio settings adjustments and provide audio systems performance updates to signal that the sounds produced is within a set of predefined tolerances. This microphone may also help indicate data from other systems. For example, if an air circulation fan's ball bearing wear out and produced a loud noise, the microphone would signal to the digital logic module that a strange sound outside of the tolerance should be examined. Another example is if a user presses an open button for an entrance door to the portable selling room, the actuator system would open a door and transmit a signal through the environmental digital logic module software to start playing an introduction program through the dynamic audio system that would greet the user and welcome them into the interactive environment.

An actuator system physically controls objects within said selling room based on the software programming within the environmental digital logic module. For example, if the user enters the room, and lies on the bed, the surveillance system would transmit a signal to the environmental digital logic module to automatically start the actuator behind the large display to extend it out and angled towards the user. The actuators can also open and close the doors used in the modular selling room based on the input received by the environmental digital logic module.

A dynamic lighting system receives inputs from the environmental digital logic module based on preprogrammed software to adjust the brightness and color of the lighting in the room to help stimulate a positive mood of the user. For example, once the environmental digital logic module notices that a user walks into the room, the lightning system may start a program top implement a series of dazzling lighting effects, and then dim the lighting whenever the environmental digital logic module notices that the user has entered the bed.

A dynamic scent and air purification system adaptively changes the smell of the room based on a theme selected through the environmental digital logic module. The scent system comprises an aroma-producing solution that utilizes a proustian effect to help enhance the total experience of the customer by transmitting a message to the customer's limbic system which then interacts with their memory and emotions. The dynamic scent and air purification system integrates itself within air circulation duct that works with the circulation system in the plenum space to ensure that the portable interactive modular selling room smell and temperature are within the tolerances defined in the environmental digital logic module.

A display system includes one or more screens comprising a combination of LCDs, Plasma screens, projectors, or any output device used to present information in a visual form. The display helps provide a cinematic effect along with a graphic user interface to not only interact but also educate the end-user with information regarding the various products available for purchase. The same display, if needed, can also provide an administration with a separate graphic user interface to make adjustment to settings and various tolerances in each system within the portable modular selling room.

An HVAC system includes one or more pieces of equipment to maintain a comfortable environment in regard to the air quality and temperature for the users within the modular room. The basic model includes a system of circulation fans to move already pre-conditioned air from the store into and out of the modular room. If needed, the modular room may include air conditioner units or heating units to maintain predefined conditions assigned within the environmental logic module.

An alphanumeric numbering system identifies each component required to construct the modular room. The numbering system clearly labels and assigns the location of each piece and also identifies how components connect to one another.

| Side A Label | Description | Side B Label |
| --- | --- | --- |
| WPF00000122 | Wall Panel Front | WPF00000123 |
| WPC00000123 | Wall Panel Connector | WPC00000124 |
| WPB00000124 | Wall Panel Bottom | WPB00000124 |

For example, if a front panel, connector and bottom panel require assembly, the alphanumeric numbering system abbreviates the description and also shows the correct piece that needs connected on all four sides. Side B on the Wall Panel Front would connect to side A on the Wall Panel Connector. Next, the Wall Panel Connector would connect to the Wall Panel Bottom.

An electrical system required to supply power to the systems within the room run from one or more plug-and-play 15-30 AMP electric connectors. Many of these connections arrive pre-manufactured within the panels to decrease the amount of time required to install and setup the electrical system. The hollow panels also include hidden sub-panels to run the required electrical wiring for the lighting, display, audio, scent, air purification system, surveillance, and HVAC system. If absolutely necessary, a hardwire connection can be installed by a licensed electrician to accommodate high electrical load devices such as air conditioning units. A junction box outside of the room connects to the electrical system of the building and provides electricity to all of the various systems within the modular room.

According to one embodiment of the present invention, an outside perspective of an example of a modular selling room in FIG. 1 shows the bedroom area 101. One or more intakes 105 force pre-conditioned air from the store into the plenum area 111 which provides a positive pressure to the air circulation. One or more exhausts 107 of the plenum area circulate air out of the plenum area 111. A receiver 109 and subwoofer 103 are shown to represent part of the dynamic audio system. Speakers not shown can be placed on the wall, ground, or ceiling depending on the make and model utilized.

Figure 2:
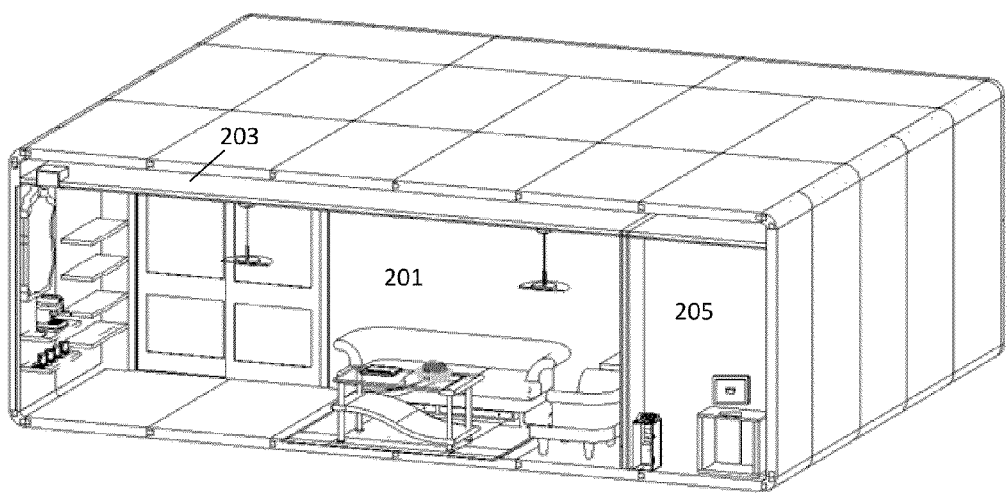
FIG. 2 illustrates an outside perspective of an example modular selling room showing the entrance area, pre-sales lounge, and hidden computer closet which includes the environmental logic module, and any other types of electronic equipment required by the various systems within the modular selling room.

An outside perspective of the modular selling room in FIG. 2 shows an entrance sales lounge 201, plenum area 203 and hidden computer closet 205, which includes the environmental logic module, and any other types of electronic equipment required by the various systems within the modular selling room.

Figure 3:
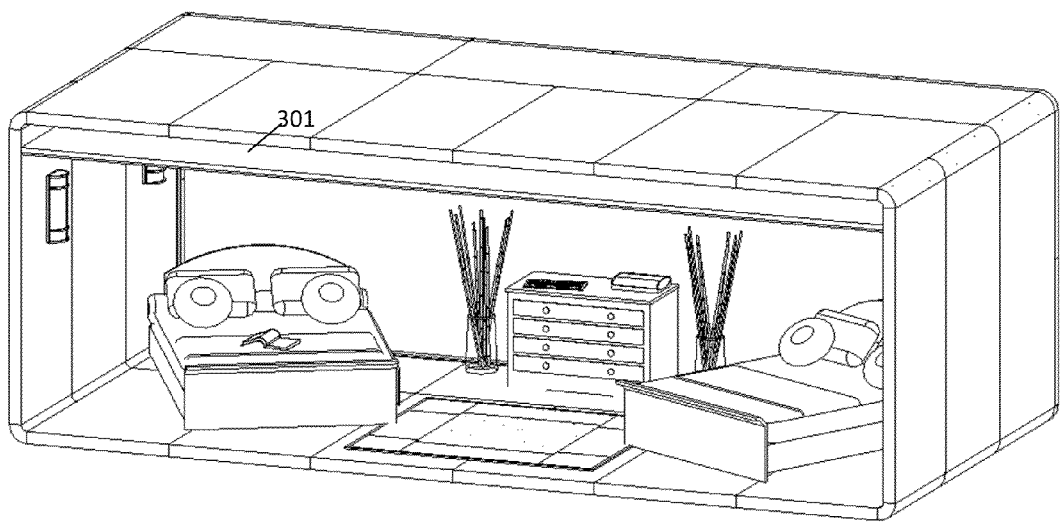
FIG. 3 illustrates a cut-out view of the bedroom, and also the plenum area above which is used to circulate air and also run cables.

A cut-out view of the bedroom area is shown in FIG. 3 which also includes the plenum area 301 which is used to circulate air and run cables.

Figure 4:
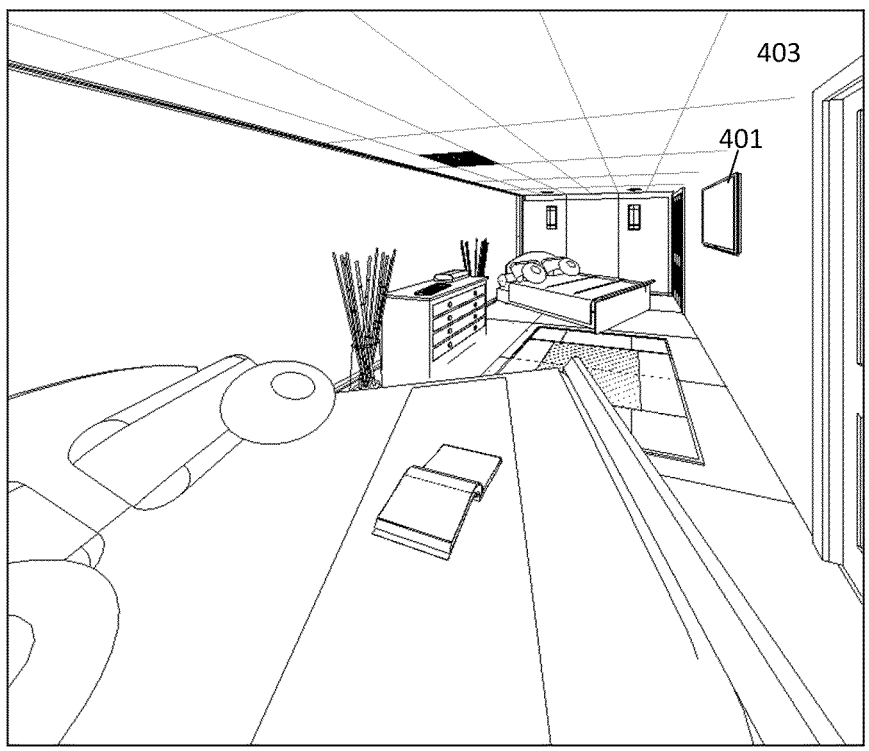
FIG. 4 illustrates an example of a bedroom décor used to enhance a customer's shopping experience.

An example of a bedroom décor used to enhance a customer's shopping experience in accordance with another embodiment of the present invention is shown in FIG. 4. The embodiment illustrated in FIG. 4 provides a flat panel display 401 connected to an interactive client based GUI computer system behind the panels 403, which interfaces with various systems to educate the customer of the various features associated with the products experienced within the bedroom.

Figure 5:
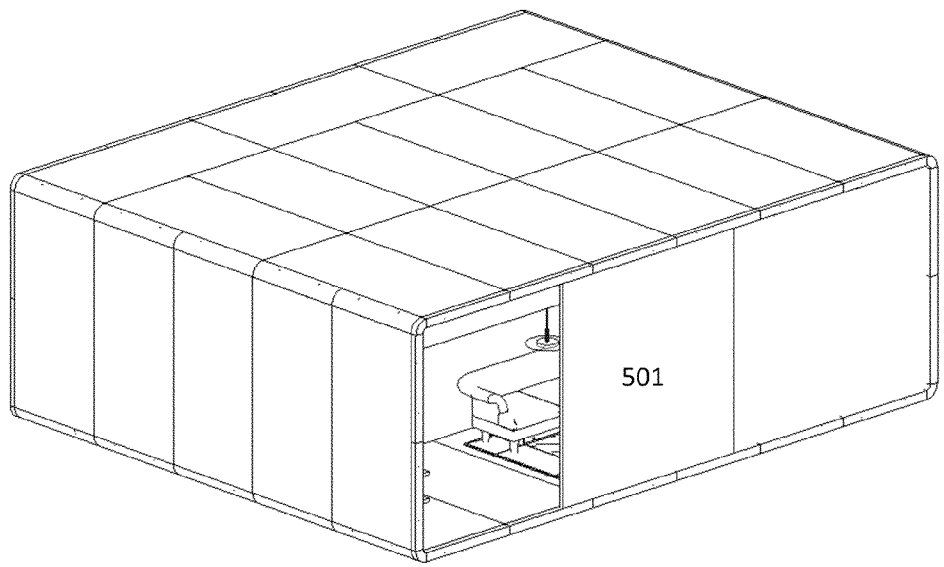
FIG. 5 illustrates an example of an sliding entrance door for a modular selling room.
Figure 5:
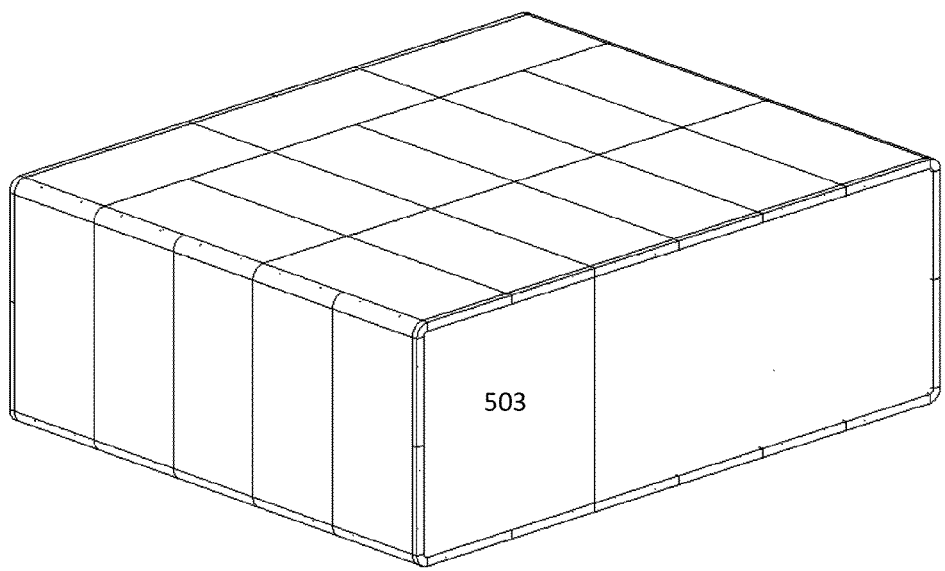

An example of a sliding entrance door is shown in FIG. 5, in which an open position 501 and a closed position 503 for the modular selling room is illustrated.

Figure 6:
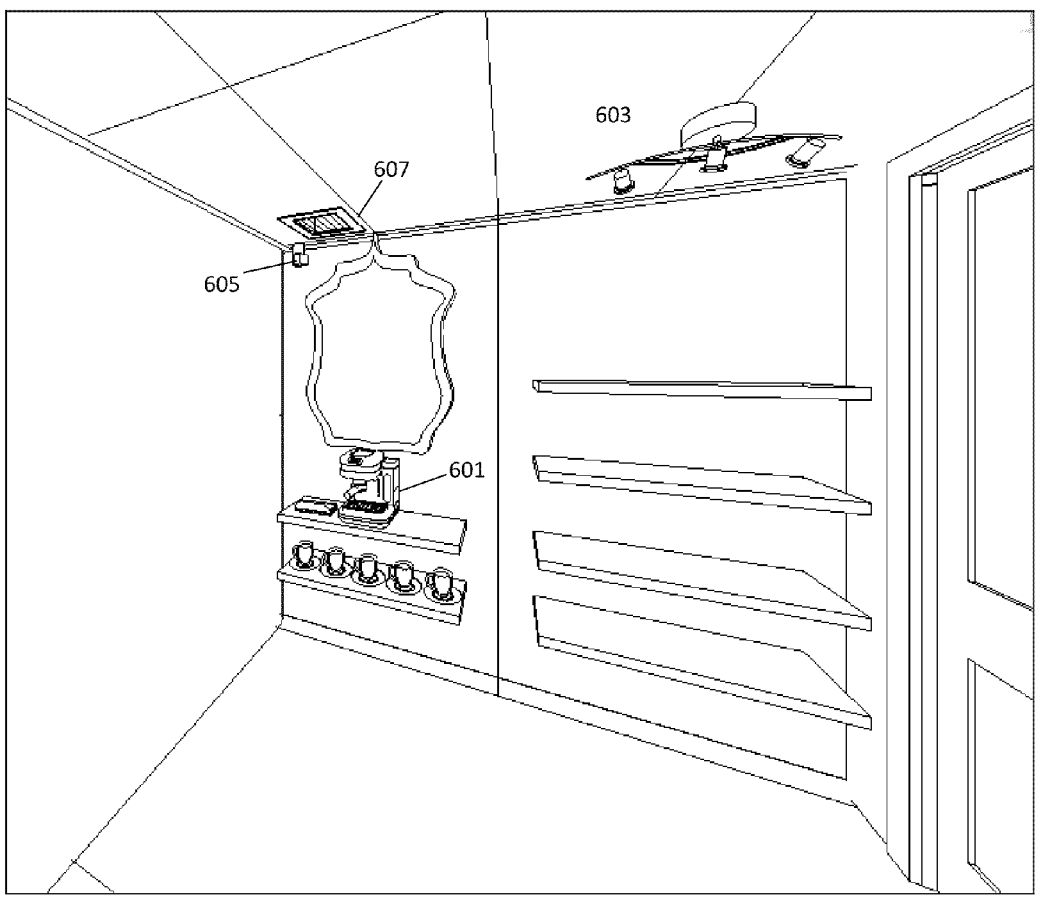
FIG. 6 illustrates an example of a cappuccino machine to allow customers to tantalize their taste buds before experiencing the product presentation within the bedroom.

FIG. 6 illustrates an example of a waiting area with a cappuccino machine 601 but remains open to a variety of different beverages choices or even food samples depending on the demographic preferences associated with the customer based on the feedback from surveys and sensors within the room. The beverage allows customers to tantalize their taste buds which encompass the sense of taste before experiencing the product presentation within the bedroom. Track lighting 603 or various other types of lighting not shown hang from the ceiling interconnected to the dynamic lighting system to enhance the experience of the customer. The HVAC system includes an exhaust port 607 into the plenum area above the ceiling panels. Speakers 605 included in the dynamic audio system can easily be hung from the corner of each room.

Figure 7:
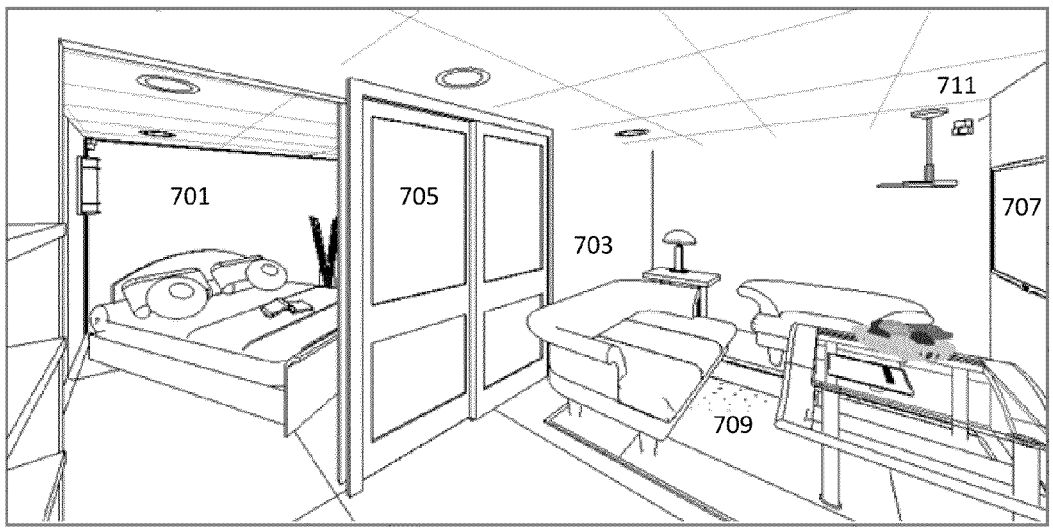
FIG. 7 illustrates an example of a relaxing and peaceful pre-sales lobby which opens up into the bedroom area.

FIG. 7 provides an example of a relaxing and peaceful pre-sales lobby which opens up into a bedroom area. The sliding door 705 allows for a sense of privacy within the bedroom area 701 for the customers. The sales room 703 includes furniture 709 and a display 707 to allow the customers to relax while learning more about the product line. Speakers and lighting fixtures 711 help complement the relaxing nature of the room.

Figure 8:
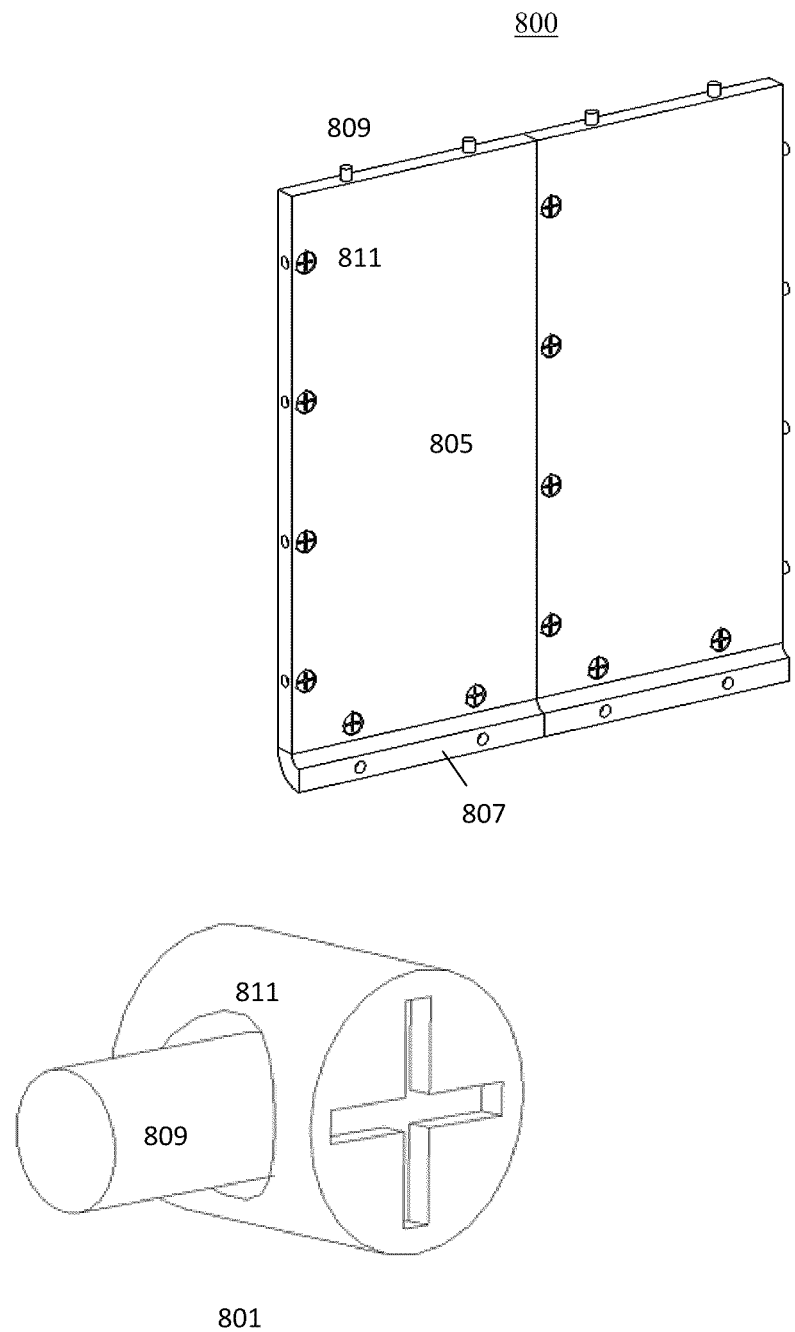
FIG. 8 illustrates an example of how cam locks connect to the various panels utilized to construct the room.

FIG. 8 shows an example of how cam lock 801 connects to a panel 805 utilized to construct the room. Cam lock's inside cylinder 809 locks into cam lock's outside cylinder 811. Sealing joints 807 may also be used to interconnect and add stability to panels 805.

Figure 9:
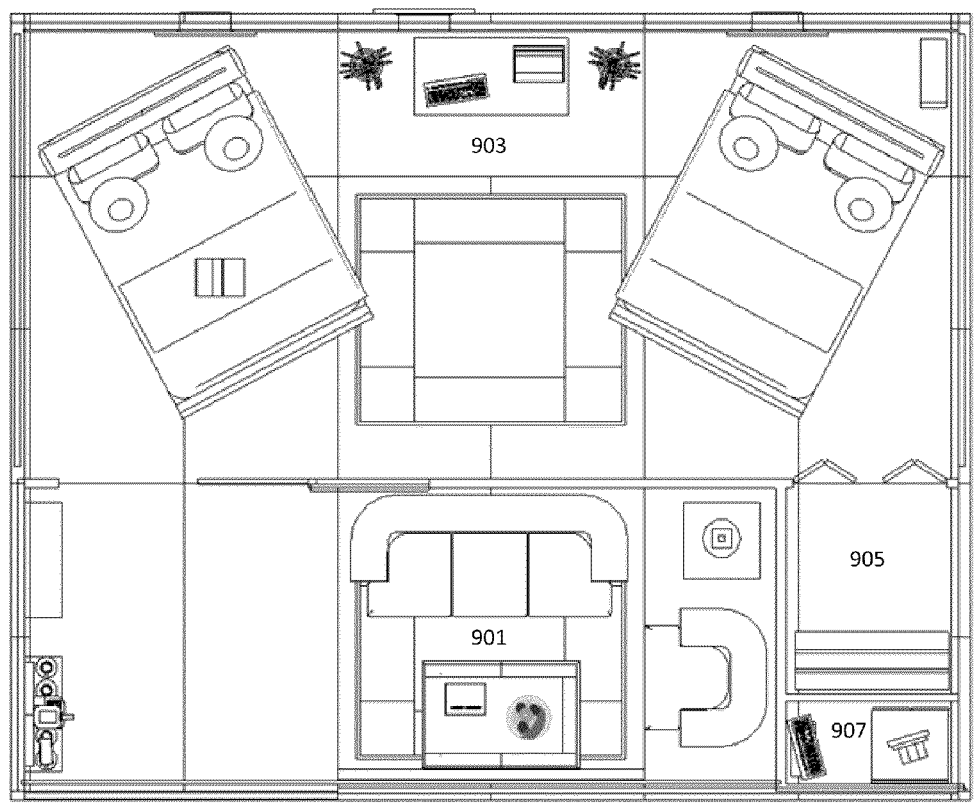
FIG. 9 illustrates an example of an overhead view of the entire assembled modular selling room.

FIG. 9 shows an example of an overhead layout including a sales area 901 used for pre-sales introductions and also post presentation interactions which can include closing deals with the customers. The bedroom area 903 allows the customers to experience the entire product line, as well as to understand the high value they would receive if they chose this particular brand. The changing room 905 allows customers to change into a comfortable robe before lying on the bed. The one room not open to the public is the computer room 907, which contains all of the electronic equipment required to make all of the systems connected to the interactive client-based GUI computer system work together.

Figure 10:
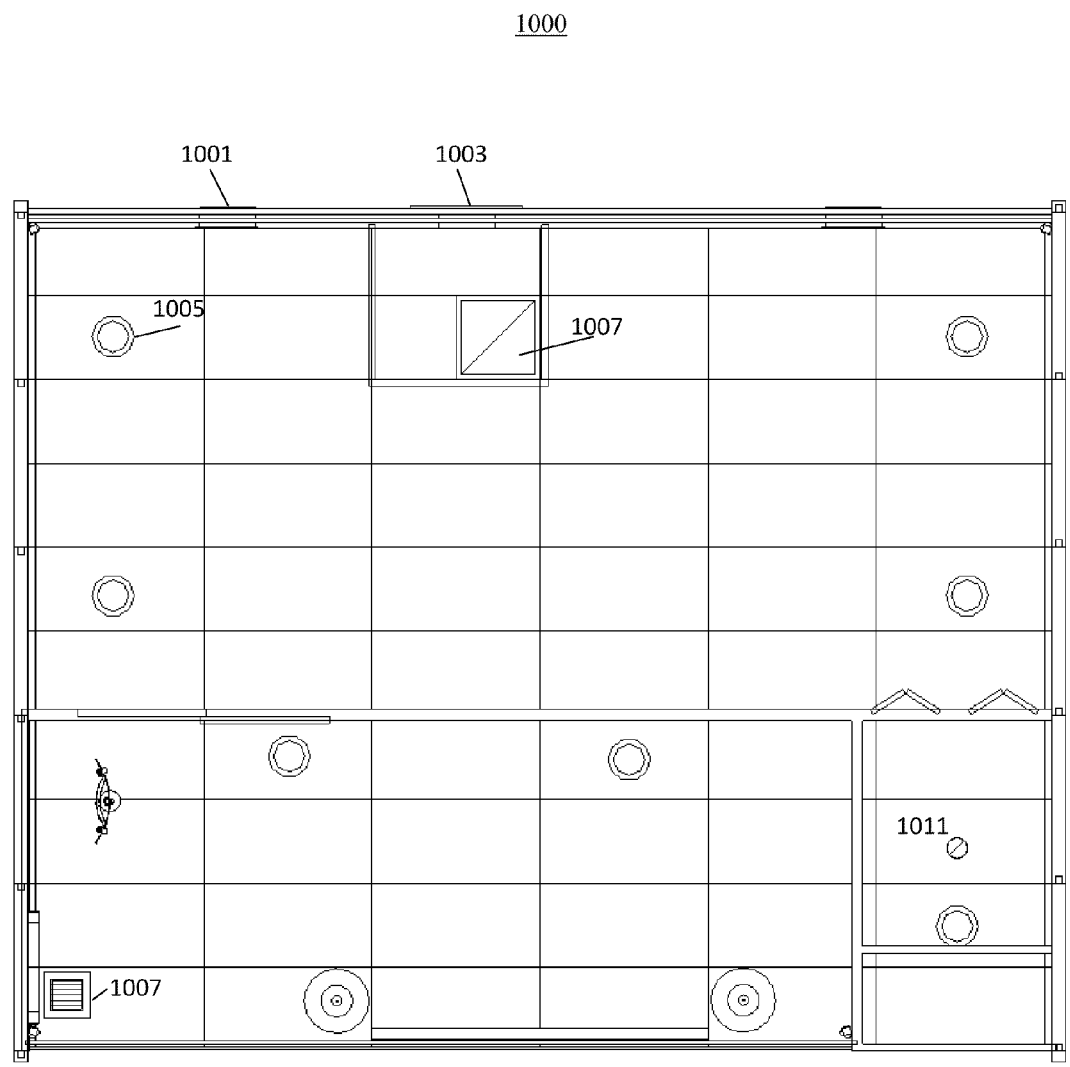
FIG. 10 illustrates an example of a plenum area layout including various lighting and air circulation units.

An example of a plenum area layout is shown in FIG. 10, which includes various lighting and air circulation units. Pre-conditioned air from the store enters via intakes 1001 into the plenum area and circulates into the rooms with a positive pressure through diffusers 1005. The air from the rooms returns through a return grill 1007 and exits the plenum area through an exhaust 1003.

Figure 11:
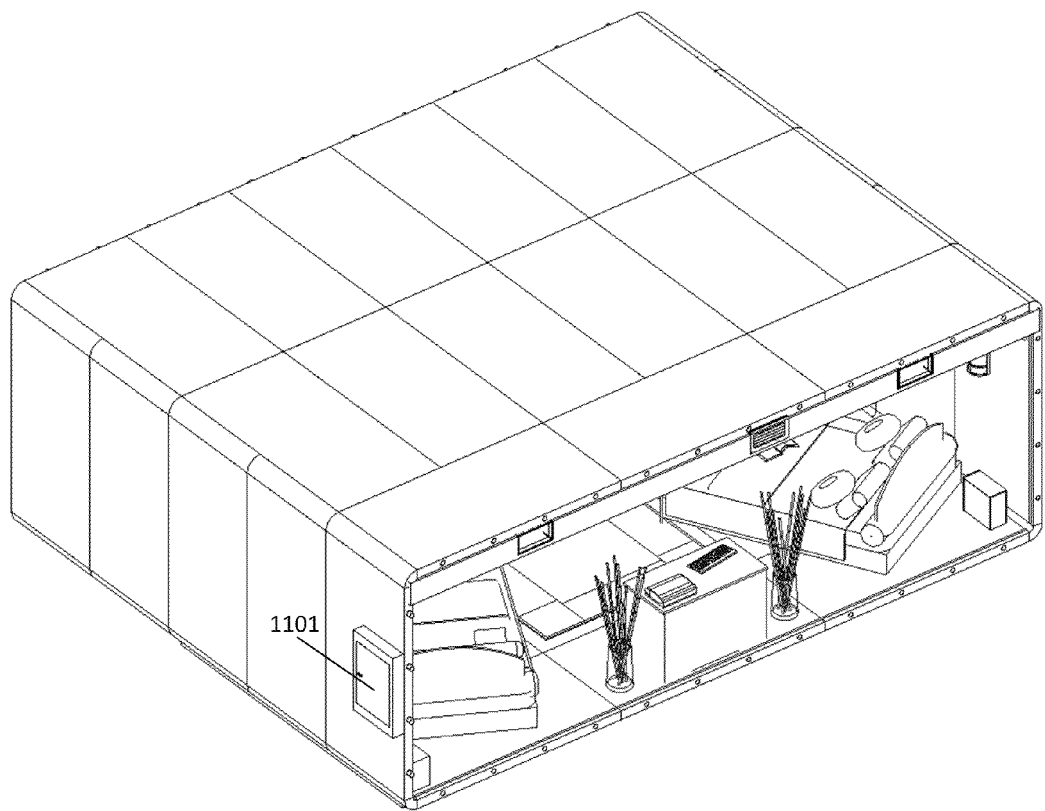
FIG. 11 illustrates an example of a junction box installed outside of the modular selling room.

In the case where state codes do not permit a plug-and-play solution of providing electricity to the modular selling room, FIG. 11 shows an example of how an electrician could install a junction box 1101 outside of the modular selling room to hardwire into the existing electrical system of the store.

Figure 12:
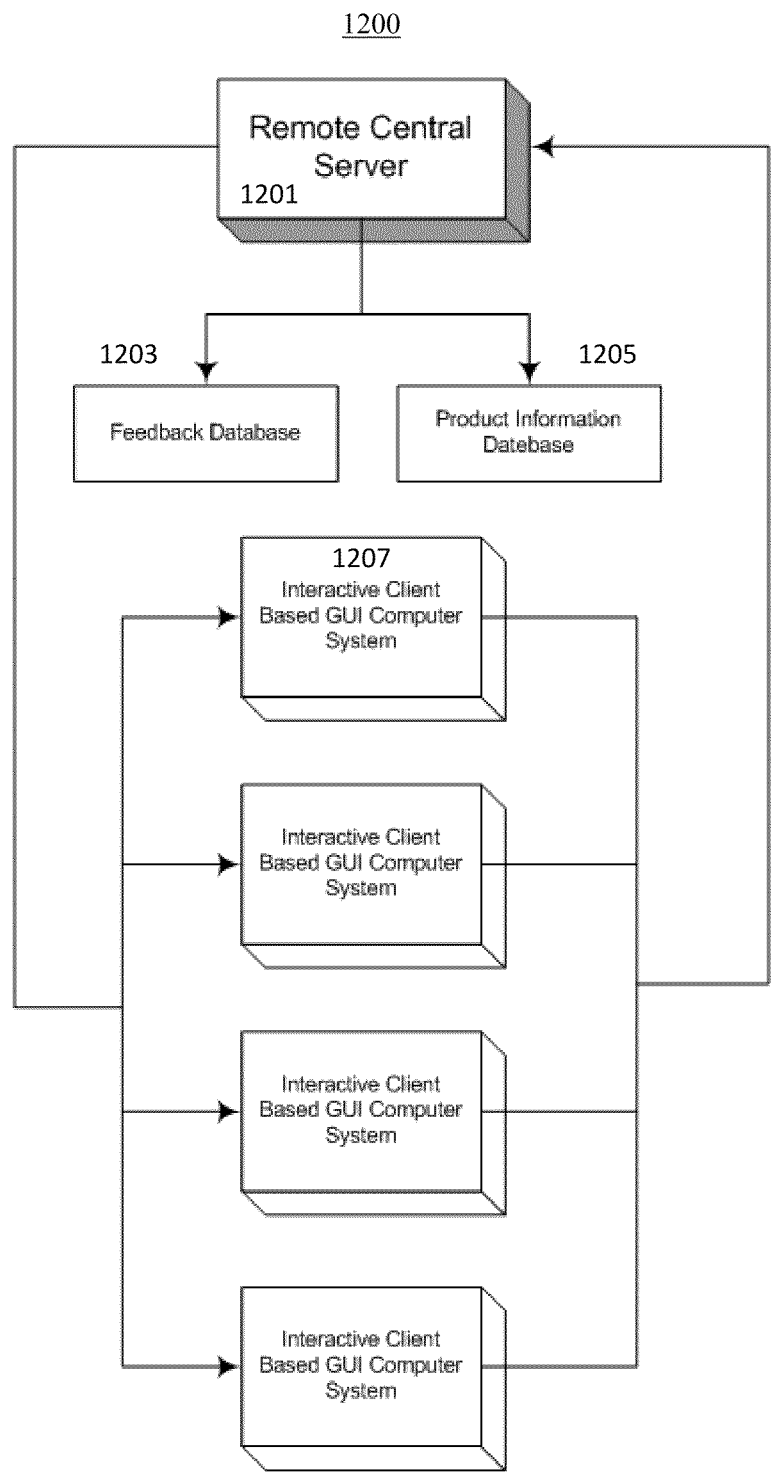
FIG. 12 illustrates an example of a network including a remote central server, feedback database, product information database connected to four clients at different locations. The network consists of ethernet cable, wireless, or fiber optics to transmit data.

FIG. 12 shows an example of a network including a remote central server 1201, feedback database 1203, and product information database 1205 connected to interactive client-based GUI computer system 1207, which may be located at different locations. The network consists of Ethernet cable, wireless, or fiber optics to transmit data between each node, as would be recognized by one of ordinary skill in the art.

Figure 13:
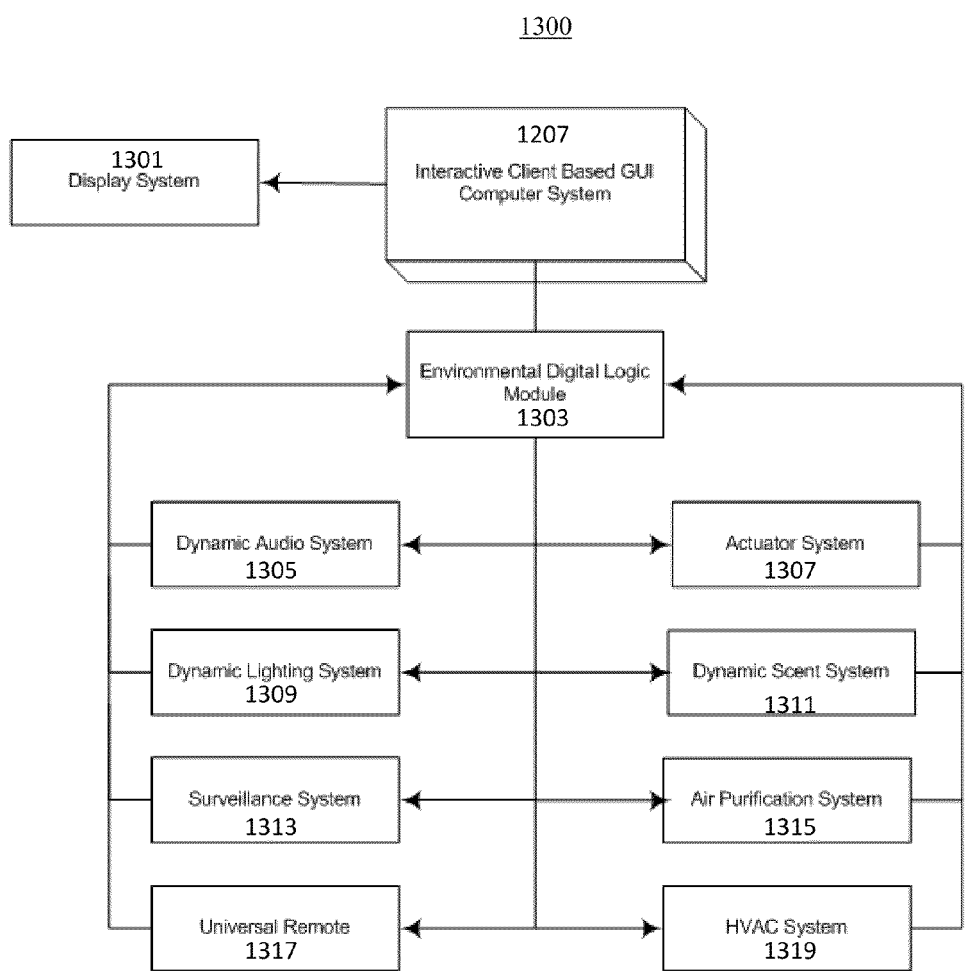
FIG. 13 illustrates an example of an interactive client based GUI computer system connected to a display system and an environmental digital logic module which interfaces a dynamic audio system, dynamic lighting system, surveillance system, universal remote, HVAC system, actuator system, dynamic scent system, and air purification system.

FIG. 13 shows an example of an interactive client-based GUI computer system 1207 connected to a display system 1301 and an environmental digital logic module 1303 which interfaces to a dynamic audio system 1305, dynamic lighting system 1309, surveillance system 1313, universal remote 1317, actuator system 1307, dynamic scent system 1311, air purification system 1315, and HVAC system 1319.

Figure 14:
FIG. 14 illustrates an example of a rendered image of what the modular room could look like in real life.
Figure 15:
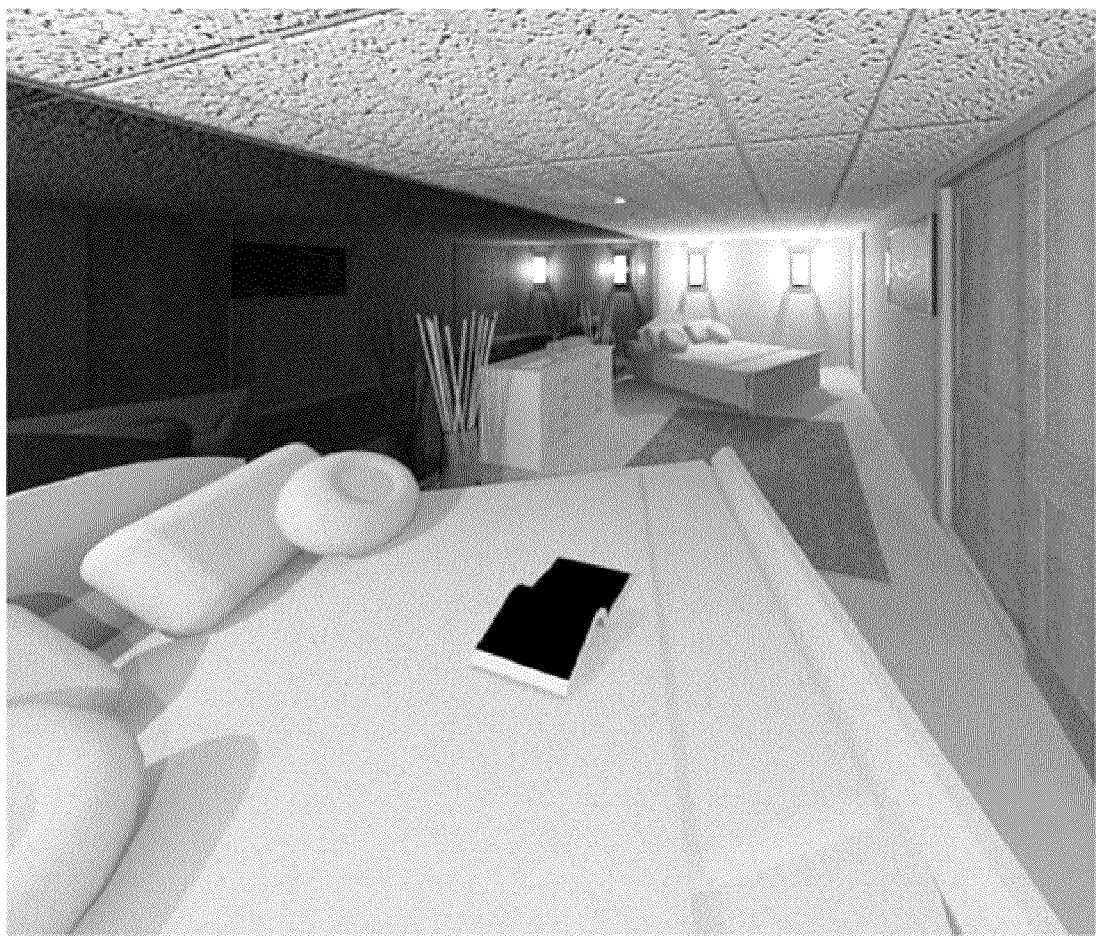
FIG. 15 illustrates an example of a rendered image of what the modular room could look like in real life.
Figure 16:
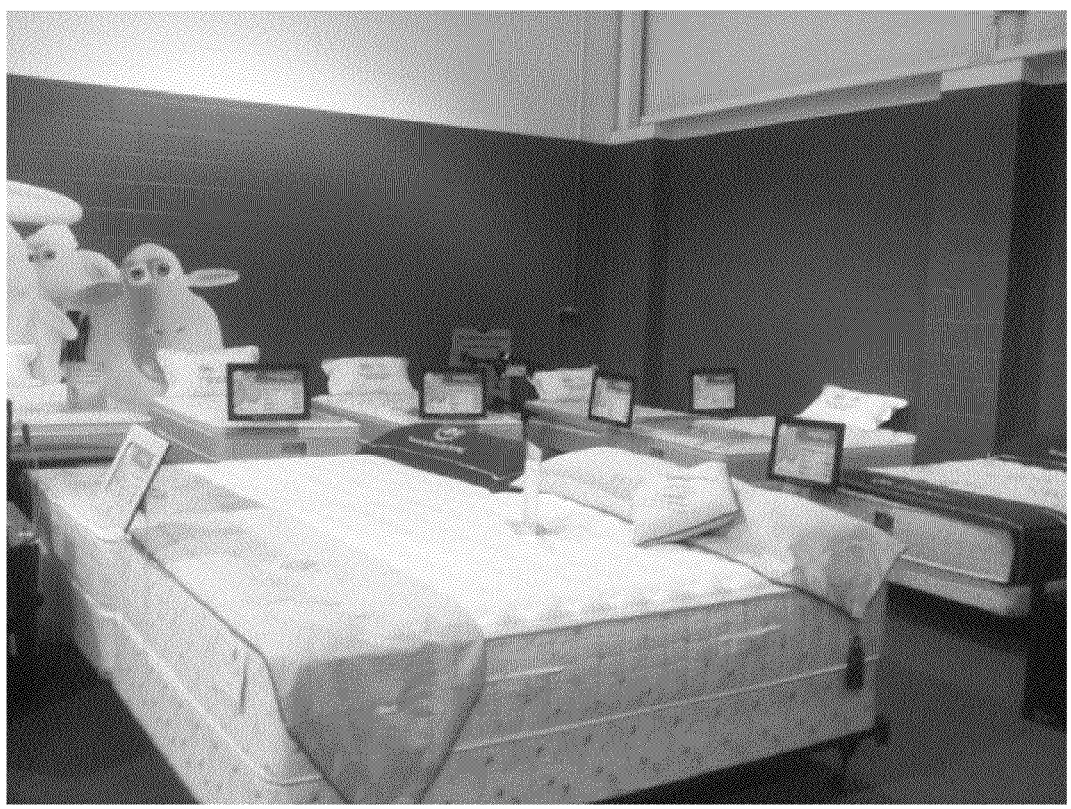
FIG. 16 illustrates a prior art sales environment.

FIGS. 14 and 15 illustrate an example of a rendered image of what the modular room could look like in real life, which is in sharp contrast to the dry look and feel of the traditional sales environment shown in FIG. 16.

A certain configuration of pre-sales lobby area, bedroom area, sales area, changing room, and computer closet is shown and described in a particular rectangular layout. However, the invention is not limited to such a layout, nor is it limited to two beds, or to any predefined number of sales and bedroom areas.

One of ordinary skill in the art will recognize that various other layouts, rearrangements, and numbers of rooms may be arranged and still be within the spirit and scope of the present invention.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. A portable interactive modular selling room for simulating a real-life environment in a retail environment, comprising:
   a set of inter-locking panels arranged to create one or more areas within the portable interactive modular selling room, including at least one sales area for receiving a potential customer as well as closing sales with the customer for one or more products, the panels comprising light weight composite material for simulating the real-life environment;
   an interactive client-based graphic user interface computer system having an adaptive environmental digital product library logic module integrated into said portable interactive modular selling room, wherein the computer system provides sensory information about the products to at least a sense of sight, sound, and smell; and
   a network communication device, operatively connected to said computer system, that establishes a communication link to a remote information collection database server for real time data exchanges,
   wherein said computer system comprises memory for storing program code for detecting a location of the customer and continuously recording an array of three-dimensional coordinates of the cutomer's location, and
   wherein the adaptive environmental digital product library logic module comprises memory for storing program code for changing a scent and an air quality within said portable interactive modular selling room in response to the customer's location.

2. The portable interactive modular selling room of claim 1, further comprising a dynamic lighting system.

3. The portable interactive modular selling room of claim 1, further comprising a dynamic audio system.

4. The portable interactive modular selling room of claim 1, further comprising a surveillance system utilizing motion-sensor activated cameras.

5. The portable interactive modular selling room of claim 1, further comprising an actuator system for controlling objects within said room.

6. The portable interactive modular selling room of claim 1, further comprising a dynamic scent and air purification system.

7. The portable interactive modular selling room of claim 1, further comprising a universal remote to accommodate user interaction.

8. The portable interactive modular selling room of claim 1, further comprising a plug-and-play based receptacle electrical hookup.

9. The portable interactive modular selling room of claim 1, further comprising a label organizational system with alphanumeric identifiers for key components.

10. The portable interactive modular selling room of claim 1, further comprising a self-contained heating, ventilating and air conditioning system.

11. The portable interactive modular selling room of claim 1, wherein the computer system further comprises memory for storing program code to:
    present information to educate the customer with various features of the products presented in the portable interactive modular selling room;
    send feedback information to the remote information collection database server; and
    correlate feedback information using a series of pre-defined weights to determine shopping patterns associated with the customer.

* * * * *